(12) United States Patent
Akechi et al.

(10) Patent No.: US 8,815,757 B2
(45) Date of Patent: Aug. 26, 2014

(54) COATED BASE FABRIC FOR AIR BAGS

(75) Inventors: Tsutomu Akechi, Shiga (JP); Mamoru Kitamura, Shiga (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 13/878,725

(22) PCT Filed: Oct. 19, 2011

(86) PCT No.: PCT/JP2011/073990
§ 371 (c)(1),
(2), (4) Date: Apr. 10, 2013

(87) PCT Pub. No.: WO2012/056954
PCT Pub. Date: May 3, 2012

(65) Prior Publication Data
US 2013/0189887 A1    Jul. 25, 2013

(30) Foreign Application Priority Data
Oct. 26, 2010    (JP) .................................. 2010-239438

(51) Int. Cl.
*B60R 21/235*    (2006.01)
*D06M 15/643*   (2006.01)
*D03D 1/02*      (2006.01)
*D03D 13/00*     (2006.01)
*D03D 15/00*     (2006.01)
*B32B 27/28*     (2006.01)

(52) U.S. Cl.
CPC ............ *D06M 15/643* (2013.01); *B32B 27/283* (2013.01); *D03D 1/02* (2013.01); *B60R 2021/23514* (2013.01); *B60R 21/235* (2013.01); *D10B 2331/02* (2013.01); *D10B 2331/04* (2013.01); *D03D 13/008* (2013.01); *D03D 15/00* (2013.01)
USPC ........................ 442/286; 280/728.1; 428/34.1

(58) Field of Classification Search
CPC .................. D06M 15/643; D03D 1/02; B60R 2021/23514; B60R 21/235; B32B 1/02; B32B 1/08; B32B 27/00; B32B 27/04; B32B 27/08; B32B 27/12; B32B 27/283
USPC ......... 280/728.1, 743.1; 428/34.1, 35.7, 36.1, 428/446, 447; 442/60, 76, 81, 168, 169, 442/164, 183, 286; 524/837; 525/478
See application file for complete search history.

(56) References Cited

U.S. PATENT DOCUMENTS 6,037,279 A * 3/2000 Brookman et al. ............. 442/71
6,416,613 B1 * 7/2002 Patrick et al. ................. 156/281
(Continued)

FOREIGN PATENT DOCUMENTS

JP      06-008779        1/1994
JP      2007-196993      8/2007
(Continued)

OTHER PUBLICATIONS

Japanese Patent Office, International Search Report for International Patent Application PCT/JP2011/073990 ( Jan. 17, 2012).

*Primary Examiner* — Arti Singh-Pandey
(74) *Attorney, Agent, or Firm* — Fish & Richardson P.C.

(57) ABSTRACT

The present invention provides a coated base fabric for an air bag which can ensure sufficient air permeability even when the coating amount of the resin is 20 g/m² or less. A coated base fabric for an air bag wherein silicone resin is coated at least on one side of the woven fabric constituted from synthetic fiber filaments which is characterized in that the coating amount of the silicone resin is 20 g/m² or less, film strength and film elongation of the resin are 3 MPa or more and 300% or more, respectively and air permeability of the coated base fabric under the pressure difference of 100 kPa is 0.02 L/cm²/min or less.

7 Claims, 1 Drawing Sheet

(56) References Cited

U.S. PATENT DOCUMENTS

| | | | | |
|---|---|---|---|---|
| 6,734,124 | B2* | 5/2004 | Hurst et al. | 442/168 |
| 7,309,666 | B2* | 12/2007 | Ishii et al. | 442/157 |
| 7,407,898 | B2* | 8/2008 | Parker | 442/81 |
| 2004/0077236 | A1 | 4/2004 | Ishii et al. | |
| 2004/0222618 | A1* | 11/2004 | Azechi et al. | 280/728.1 |
| 2009/0247030 | A1 | 10/2009 | Kano et al. | |

FOREIGN PATENT DOCUMENTS

| | | |
|---|---|---|
| JP | 2008-138305 | 6/2008 |
| JP | 2008-214834 | 9/2008 |
| JP | 2011-58118 | 3/2011 |
| JP | 2011-074522 | 4/2011 |
| JP | 2011-080158 | 4/2011 |
| WO | 02/061200 | 8/2002 |
| WO | 2010/137282 | 12/2010 |

* cited by examiner

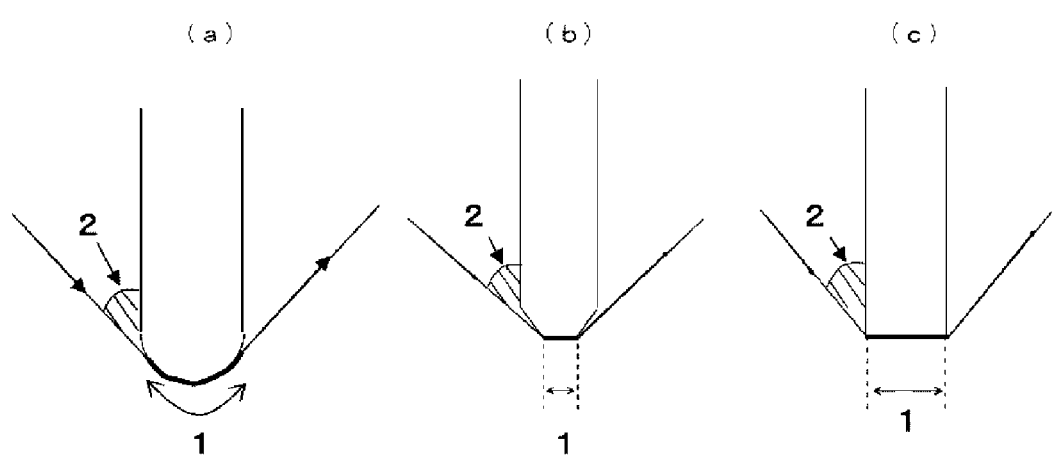

COATED BASE FABRIC FOR AIR BAGS

TECHNICAL FIELD OF THE INVENTION

The present invention relates to a coated base fabric used for air bags for cars. More particularly, it relates to a coated base fabric for air bags which can achieve low air permeability even when the coated amount to be adhered to the woven fabric is lightweight.

BACKGROUND ART

An air bag has been quickly increasing in its installing rate in recent years as one of the safety parts for cars. The air bag is used for such a purpose that, in car collisions, a sensor perceives the shock, gas of high temperature and high pressure is generated from an inflator and the air bag is quickly developed by the gas whereby the collision of the bodies or, particularly, the heads of a driver and a passenger to steering wheel, windshield, door glass, etc. is prevented and protected. In recent years, air bags for cars have been developed in their practical use not only for a driver seat and a passenger seat but also for knee air bags, side air bags, curtain air bags, etc. and installment of a plurality of air bags is now becoming common.

As regions and numbers of the installed air bags are increasing, there has been an increasing demand for making the weight and the size of an air bag system lighter and more compact and each of the parts of the system has been designed with a target of making the weight lighter and the size more compact. In view of such a background, air bags have been investigated for a plan of using a base fabric made of the yarn of small fineness or for a plan of reducing the type of elastomer of a coating woven fabric and the coating amount.

For example, fineness of a filament used in a coated base fabric for air bags is becoming finer from 940 dtex to 470 dtex and, in recent years, there has been a change to a base fabric which uses the filaments having fineness of 350 dtex.

Also, an elastomer resin which is coated to a coated base fabric for air bags has been changed from chloroprene to silicone resin. Further, its coating amount has been changed from 90-120 g/m$^2$ to 40-60 g/m$^2$ and, in recent years, it has been reduced to an extent of 25-40 g/m$^2$. Although considerable enhancement has been achieved by such a means in view of package ability, it is not still in a fully satisfactory level and there has been a demand for improved package ability and light weight by further reduction of the coating amount.

On the other hand, a coated woven fabric which is coated with synthetic rubber or resin such as silicone has been mostly used for side air bags, curtain air bags, knee air bags, etc. where an inner pressure keeping property is particularly demanded. When the resin amount is reduced to 20 g/m$^2$ or less in the woven fabric as such, the resin amount positioned on the surface extremely decreases, breakage of the resin film is apt to happen and keeping the low air permeability to a high extent becomes difficult.

With regard to a coated base fabric for air bags where the coating amount of silicone resin is reduced, there is a disclosure for an air bag where elastomer is unbalancedly present in terms of a coating thickness ratio of not less than 3.0 between thread and thread of the woven fabric to 1.0 of woven fabric yarn area which constitutes the woven fabric (see Patent Document 1).

Although package ability is improved in the above air bag, breakage of the resin film is apt to happen under the state where the resin is unbalancedly present as mentioned above when a coating amount is adjusted to 20 g/m$^2$ or less and it is difficult to fully satisfy the low air permeability particularly for an air bag where the inner pressure keeping property is demanded.

There is also a disclosure for a coated base fabric for air bags where not less than 90% of the outer circumstances of the cross sections of warp and weft positioned at the resin-coated surface of the synthetic fiber woven fabric are surrounded by said resin and the coating amount of the resin is not more than 20 g/m$^2$ (see claim 2 of Patent Document 2). In this base fabric, although the adhesion of the base fabric to the resin is enhanced due to impregnation of the resin, the resin film positioned on the woven fabric surface is thin whereby breakage is apt to happen on the film and it is difficult to fully satisfy the low air permeability particularly for an air bag where the inner pressure keeping property is demanded.

PRIOR ART DOCUMENTS

Patent Documents

Patent Document 1: Japanese Patent Application Laid-Open (JP-A) No. 8779/94
Patent Document 2: Japanese Patent Application Laid-Open (JP-A) No. 2008-138305

DISCLOSURE OF THE INVENTION

Problem that the Invention is to Solve

An object of the present invention is to provide a coated base fabric for an air bag which can ensure sufficient air permeability even when the coating amount of the resin is 20 g/m$^2$ or less.

Means for Solving the Problem

The coated base fabric for an air bag according to the present invention which can solve the above problem comprises the following constitutions:

Thus, the present invention is a coated base fabric for an air bag wherein silicone resin is coated at least on one side of the woven fabric constituted from synthetic fiber filaments, characterized in that
the coating amount of the silicone resin is 20 g/m$^2$ or less, film strength and film elongation of the resin are 3 MPa or more and 300% or more, respectively and air permeability of the coated base fabric under the pressure difference of 100 kPa is 0.02 L/cm$^2$/min or less.

Also, preferred embodiment of the present invention is a coated base fabric for an air bag, wherein the silicone resin is a solvent-free silicone of an addition polymerization type and contains 1 to 45 ppm of a platinum catalyst to the resin composition and viscosity of the silicone resin before coating is 15 to 60 Pa·sec.

Also, preferred embodiment of the present invention is a coated base fabric for an air bag, wherein the method for coating the resin is a knife coating method and the tip radius of the knife used therefor is 0.7 mm or less.

More preferred embodiment of the present invention is that (a) the total fineness of the filaments constituting the woven fabric is 200 to 470 dtex and (b) the cover factor of the woven fabric is 1,800 to 2,500.

Advantages of the Invention

The coated base fabric for an air bag according to the present invention exhibits low air permeability even when thinly coated. Thus, it is highly reliable, can be compactly stored and makes the restriction of interior design of cars can be made little even for an air bag where particularly high inner pressure keeping property is demanded.

BRIEF DESCRIPTION OF THE DRAWINGS

FIG. 1 is a drawing which shows a contacting area of a base fabric to a knife blade upon coating of the resin using a floating knife coat.

EXPLANATION OF REFERENCE NUMBER

1: contacting area
2: resin

BEST MODE FOR CARRYING OUT THE INVENTION

The present invention will now be illustrated in detail as hereunder.

The woven fabric constituted from synthetic fiber filament in the present invention means a woven fabric which is woven using synthetic fiber filament yarn. The woven fabric is excellent in mechanical strength and is excellent in such a respect that thickness can be made thin. The tissue of the woven fabric may be plain weave, twill weave, satin weave and variant weave thereof, multiaxial weave, etc. Among them, plain weave which is excellent in mechanical strength is particularly preferred.

With regard to the synthetic fiber, the particularly used ones thereof are aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate. Besides the above, all-aromatic polyester fiber, poly-p-phenylenebenzobisoxazole fiber (PBO fiber), ultra-high molecular polyethylene fiber, polyphenylene sulfide fiber, polyether ketone fiber, etc. can be used. However, when economy is taken into consideration, the polyester fiber and the polyamide fiber are preferred and the polyamide 6,6 is particularly preferred. In those fibers, a part of or all of them may be prepared from the recycled raw materials.

In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn may be not only the ordinary round cross section but also the differently shaped cross section. It is preferred to use multifilament yarn of 72 filaments or more for the synthetic fiber in view of softness and flatness/smoothness of the coated surface.

It is necessary that the air permeability under the pressure difference of 100 kPa of the coated base fabric of the present invention is 0.02 L/cm$^2$/min or less. During the development of the common air bag, inner pressure of 30 to 50 kPa is imposed and, due to the further influence of the heat by explosives in an inflator, it is necessary to discuss the air permeability under the pressure difference of 100 kPa when the fabric is measured at a standard state. More preferably, the air permeability is 0.01 L/cm$^2$/min or less. When the air permeability under the pressure difference of 100 kPa is higher than 0.02 L/cm$^2$/min, it is not possible to satisfy the passenger-restricting property in side air bags, curtain air bags and knee air bags for which the inner pressure keeping property is particularly demanded whereby that is not preferred.

In a coated base fabric where the adhered amount of the resin is lightweight, film thickness of the resin is usually thin whereupon breakage happens in the coated resin film under the pressure difference of 100 kPa and the air permeability increases. Now the present inventors have surprisingly found such a novel technical idea which has not been solved in the prior art that, even when the coating amount is as small as 20 g/m$^2$ or less, air permeability is greatly improved in spite of light weight when the resin used for coating has the film strength of 3 MPa or more and the film elongation of 300% or more.

In the case of a coated fabric where the coating amount is 20 g/m$^2$ or less, the coat cannot resist against the shock by the hot gas generated by an inflator and is broken whereupon air permeability becomes high when the film strength of the silicone resin is less than 3 MPa. More preferably, the film strength is 4 MPa or more. In addition, when the film elongation of the silicone resin is less than 300%, the silicone resin cannot follow the movement of the yarn which occurs upon loading the pressure whereupon breakage of the coat happens. More preferably, the film elongation is 320% or more.

A sample for the measurement of strength and elongation of the film of silicone resin is manufactured depending upon the conditions (temperature, time and pressure) for preparing a coat after the resin is actually coated on a fabric for air bag.

The coated base fabric of the present invention may be a both-side-coated one where coating is done on both sides of the woven fabric but, in view of the package ability, a single-side-coated one where coating is done merely on one side is more preferred.

As to the resin for coating, preferred one is an elastomer resin having heat resistance, cold resistance and flame resistance and the most effective one is a silicone resin. Specific examples of the silicone resin include a silicone rubber of an addition polymerization type, etc. Examples of the silicone type resin include dimethylsilicone rubber, methylvinylsilicone rubber, methylphenylsilicone rubber, trimethylsilicone rubber, fluorosilicone rubber, methylsilicone resin, methylphenylsilicone resin, methylvinylsilicone resin, epoxy-modified silicone resin, acrylic-modified silicone resin and polyester-modified silicone resin. Among them, the particularly suitable one is methylvinylsilicone rubber which has rubber elasticity after curing, shows excellent strength and elongation and is advantageous in terms of cost.

In the present invention, resin viscosity of the silicone resin used therefor is very important. Viscosity of the silicone resin is preferred to be 15 to 60 Pa·sec and more preferred to be 20 to 50 Pa·sec. Generally, setting the strength and the elongation of the silicone resin film high can be achieved by making the resin viscosity high but, when the resin viscosity becomes 60 Pa·sec or higher, it is difficult to adjust the coating amount to 20 g/m$^2$ or less. On the other hand, when the resin viscosity is less than 15 Pa·sec, the outcome is not only that the desired film properties of the silicone resin cannot be achieved but also that, due to incorporation of the resin into the woven fabric, it is difficult to secure the resin thickness necessary for achieving the low air permeability. Any of solvent type and solvent-free type ones may be used provided that adjustment to the above viscosity range is possible but, when the influence to the environment is taken into consideration, a solvent-free type one is suitable.

In the present invention, in the case of the resin composition containing an additive other than resin, viscosity of the resin composition is also defined as "viscosity of resin".

An alkenyl group-containing polysiloxane is an ingredient acting as a main component constituting the coated layer of the coated fabric according to the present invention. The alkenyl group-containing polysiloxane contains two or more alkenyl groups binding to silicon atom in a molecule so as to form a silicone resin film having rubber elasticity after curing the resin. With regard to the alkenyl group-containing polysiloxane ingredient, it is important in the present invention that (A1) an alkenyl group-containing polysiloxane having the molecular weight of 35000 or more and (A2) an alkenyl group-containing polysiloxane having the molecular weight of 30000 or less are mixed and used. As a result of mixing of the two kinds of alkenyl group-containing polysiloxanes having different molecular weights, it is now possible to give a silicone resin where the resin viscosity is not more than 60 Pa·sec while the film properties can be still maintained. More preferably, molecular weight of (A1) is 40000 or more and that of (A2) is 25000 or less.

Examples of the position of silicon atom to which alkenyl group is bound in the alkenyl group-containing polysiloxane skeleton are the terminal of molecular chain and/or the midway of molecular chain (non-terminal of molecular chain). Preferred one is a straight-chain type containing alkenyl groups which bind to silicon atoms in both positions.

It is also very important that the mixing rates to the total mass of the alkenyl group-containing polysiloxane at that time are 11 to 30% of the ingredient (A1) and 70 to 89% of the ingredient (A2). When the rate of the ingredient (A1) is less than 11% (the rate of the ingredient (A2) is more than 89%), the desired film properties of the silicone resin cannot be achieved. On the other hand, when the rate of the ingredient (A1) is more than 30% (the rate of the ingredient (A2) is less than 70%), reactivity with a cross-linking agent extremely lowers and, in addition, viscosity of the silicone resin composition increases. More preferably, the ingredient (A1) is 15 to 30% and the ingredient (A2) is 70 to 85%.

Viscosity of the alkenyl group-containing polysiloxane ingredient at 25° C. is preferred to be 10,000 to 50, 000 mPa·sec and particularly preferred to be 15, 000 to 45, 000 mPa·sec in view of the physical properties (such as adhesive ability of the cured product to the fiber, strength of rubber and anti-blocking property) and also of the working ability.

An organo hydrogen polysiloxane constituting the silicone resin acts as a cross-linking agent as a result of hydrosilylating addition reaction to alkenyl group-containing polysiloxane. Molecular structure of the organo hydrogen polysiloxane maybe any of straight chain, ring, branched chain and three-dimensional net work structure for example.

The organo hydrogen polysiloxane contains at least two (usually, about 2 to 300) hydrogen atoms binding to silicon atom in a molecule. When the organo hydrogen polysiloxane has a straight chain structure, those hydrogen atoms binding to silicon atom may be positioned only on any of the terminal of molecular chain and the midway of molecular chain (i.e., non-terminal of the molecular chain) or may be positioned on both.

Viscosity of the organo hydrogen polysiloxane (B) at 25° C. is preferred to be 0.1 to 1,000 mPa·sec and particularly preferred to be 0.1 to 500 mPa·sec.

Compounding amount of the organo hydrogen polysiloxane (B) is in such an amount that hydrogen atom(s) binding to silicon atom in the ingredient (B) to one alkenyl group binding to silicon atom in the ingredients (A1) and (A2) is/are usually within a range of 1 to 20, more preferably 1 to 10, and particularly preferably 1 to 5.

When the silicone resin is used, a reaction curing agent maybe used and its representative example is a platinum or platinum compound catalyst (a platinum type catalyst). Known ones may be used and specific examples thereof include platinum black, chloroplatinic acid, alcohol-modified chloroplatinic acid and a complex of chloroplatinic acid with olefin, aldehyde, vinylsiloxane or acetylene alcohol. The more addition of a platinum compound catalyst, the more promotion of a hydrosilylation reaction and, usually, 100 to 2000 ppm in terms of metal platinum amount is added to the composition. However, it has now been surprisingly found that, when two kinds of alkenyl group-containing polysiloxanes having different molecular weights are mixed in a predetermined ratio in accordance with the present invention, sufficient curing is achieved even in a metal platinum amount of not more than 45 ppm while the film properties can be still maintained. In view of the cost, it is preferred to be 40 ppm or less and more preferred to be 30 ppm or less. Lower limit of the metal platinum amount is preferably 1 ppm or more and, more preferably, 3 ppm or more.

It is preferred that an adhesive aid is contained in the silicone resin for enhancing the adhesive property between the silicone resin and the base fabric. Examples of the adhesive aid include, but not limited to, at least one or more member(s) selected from the group consisting of amino-type silane coupling agent, epoxy-modified silane coupling agent, vinyl type silane coupling agent, chlorine-type silane coupling agent and mercapto-type silane coupling agent.

An inorganic filler to be added to the silicone resin has been already used as a filler for a purpose of reinforcement of silicone resin, adjustment of viscosity, enhancement of heat resistance, enhancement of flame retarding property, etc. The most representative filler is silica particles. Specific surface area of the silica particles is preferred to be not less than 50 $m^2/g$, more preferred to be 50 to 400 $m^2/g$ and more preferred to be 100 to 300 $m^2/g$. When the specific surface area is within this range, excellent tear strength is apt to be given to the resulting cured silicone. The specific surface area is measured by a BET method. One type of the silica particles maybe used solely or two or more thereof may be used jointly. Examples of the silica particles used in the present invention include a natural one such as quartz, rock crystal, silica sand or diatomaceous earth and a synthetic one such as dry silica, silica fume, wet silica, silica gel or colloidal silica.

The above-mentioned silica particles are preferred to be hydrophobic silica particles where the particle surface is subjected to a hydrophobic treatment, whereby better fluidity is apt to be given to the resin composition containing silicone resin and additive. For example, preferable one is an organosilicon compound such as methylchlorosilane (e.g., trimethylchlorosilane, dimethyldichlorosilane and methyltrichlorosilane), dimethylpolysiloxane or hexaorganodisilazane (e.g., hexamethyldisilazane, divinyltetramethyldisilazane and dimethyltetravinyldisilazane).

Amount of the silica particles is preferred to be 10 to 20% by mass and more preferred to be 12 to 18% by mass to all of the silicone resin. When the amount of the silica particles is less than 10% by mass, the mechanical strength of the silicone resin is apt to become low. On the other hand, when the amount of the silica particles is more than 20% by mass, fluidity of the resin composition is apt to become low resulting in deterioration of the coating work. In addition, the resin is apt to become brittle resulting in reduction of the adhesive property.

Method of coating the resin is very important in the present invention for designing a coated base fabric achieving the low air permeability, with a proviso that the coating amount of the resin is as small as not more than 20 g/m².

As to a method for coating the resin, the conventional known method may be used. The most preferred one is a knife coating because adjustment of the coating amount is easy and influence upon mixing the foreign matters (projecting things) is small. With regard to the knife used for the knife coating, the shape of the tip thereof may be semicircular or angular (FIG. 1).

In order to reduce the coating amount of the resin to an extent of not more than 20 g/m² by a knife coating, it is effective to enhance the tension of the base fabric in the direction of contacting pressure or, particularly, in the direction of movement. However, in the knife blade which has been conventionally used for the conventional knife coating, the radius (R) of the tip is about 0.7 mm even in the sharp one when the tip is in semicircular shape. Therefore, in order to reduce the coating amount of the resin to an extent of not more than 20 g/m², it is necessary that the tension of the base fabric in the movement direction is made considerably high. As a result thereof, the difference in the crimp rates in the directions of warp and weft becomes large and the thickness of the resin film in the direction having large crimp rate is reduced. As a result, the coated film is broken upon loading the pressure even when a silicone resin which can achieve the desired strength and elongation of the film is used whereupon it was not possible to maintain the low air permeability.

On the other hand, in the present invention, it is preferred to use a knife blade having the tip radius (R) of less than 0.7 mm in the manufacture of a coated base fabric using a knife coat and, more preferably, it is preferred to conduct the coating under such a condition that the base fabric tension is made low using a knife blade having R of 0.3 mm or less. Since the adhered amount of the resin can be reduced without increasing the tension of the base fabric using a sharper knife blade than the conventional one, the crimp rates in the direction of warp and weft can be made uniform. As a result, film thickness of the silicone resin on the woven fabric surface can be controlled to thick whereby it is now possible to maintain the high air permeability. The tip radius of the knife blade can be measured by a radius gage or by a displacement measuring device using laser beam.

Tension of the base fabric in the movement direction in the knife coating is preferred to be 300 to 700 N/m and particularly preferred to be 400 to 650 N/m. When the tension of the base fabric in the movement direction is less than 300 N/m, the size of the selvage of the base woven fabric becomes high whereupon a big difference is apt to happen between the coating amounts to the central area and to the terminal area of the base fabric. On the other hand, when the tension of the base fabric in the movement direction is more than 700 N/m, the crimp rates in the directions of warp and weft become unbalanced whereby the silicone resin coating film on the woven fabric surface becomes thin in both directions of warp and weft and air permeability becomes high.

As methods for drying and curing the coating agent after the coating, the common heating methods such as hot air, infrared ray or microwave may be used. With regard to heating temperature and time, it will do if the temperature reaches the sufficient one for curing the silicone resin and it is preferred that the heating temperature is 150 to 220° C. and the heating time is 0.2 to 5 minute(s).

The total fineness of the filament yarn constituting the woven fabric is preferred to be 200 to 470 dtex. When the total fineness is more than 470 dtex, the thickness of the base fabric increases whereupon the package ability of air bag is apt to be deteriorated. On the other hand, when the total fineness is less than 200 dtex, mechanical characteristics of the air bag upon working such as tensile strength and tear mechanical characteristic of the coated base fabric are apt to become low.

Cover factor of the woven fabric to be used as a base fabric is preferred to be 1,800 to 2,500 and more preferred to be 1,900 to 2,450. When the cover factor is less than 1,800, the physical properties which are necessary for air bags (such as tensile strength and tear strength) become low. On the other hand, when the cover factor is more than 2,500, limitation is resulted in weaving and package ability. Incidentally, the cover factor CF is calculated by the following formula:

$$CF = \sqrt{(\text{Total fineness of warp}) \times (\text{Density of warp})} + \sqrt{(\text{Total fineness of weft}) \times (\text{Density of weft})}$$

Unit for the total fineness is dtex and that for the weaving density is (yarn numbers)/2.54 cm.

When the cover factor of the woven fabric is high, it is possible to prepare a coated base fabric for airbags which is excellent in the low air permeability and, in particular, excellent in the low air permeability with a small coating amount even when the resin is not thickly coated between thread and thread of the woven fabric (hollow area of the texture).

EXAMPLES

As hereunder, the present invention will be specifically illustrated by way of Examples although the present invention is not limited to those Examples. Incidentally, various evaluations in the Examples were done according to the following methods:

(1) Total Fineness

Total fineness was measured according to the method mentioned in JIS L-1095 9.4.1.

(2) Filament Count

Filament count were counted from the cross-sectional picture of the filament yarn.

(3) Weaving Density

Weaving density was measured according to the method mentioned in JIS L-1096 8.6.1.

(4) Viscosity of Resin

Viscosity of resin was measured by a B type viscometer according to the method mentioned in JIS K-7117.

(5) Strength and Elongation of Silicone Resin Film

A film of the silicone resin in a uniform thickness of 0.5 mm was prepared. Using this film, a tensile test was conducted at the speed of 10 mm/min where the distance between the gripping positions was 10 mm and strength and elongation upon breakage were measured. As to the drying temperature and time of the resin, the condition when the resin was actually coated to the fabric and the resin was cured was adopted.

(6) Coating Amount

A coated fabric after curing the resin was precisely cut into 5 cm square and dipped in a solvent which only dissolves the fiber constituting a base fabric (hexafluoroisopropanol in the case of Polyamide 66) so as to dissolve the base fabric. After that, only a silicone-coated layer being an insoluble matter was recovered, washed with acetone and dried in vacuo to weigh the sample. The coated amount was expressed in terms of mass per 1 m² (g/m²).

(7) Amount of Metal Platinum in Silicone Resin

1) Firstly, as a pretreatment, a coated fabric after curing the resin was precisely cut into 5 cm square and the total weight was measured. This sample was placed in a crucible made of boron nitride and then 1 mL of concentrated sulfuric acid and few drops of hydrofluoric acid were added thereto. Carbonization was conducted together with blending in an acid followed by making into ash using an electric furnace (550° C.) After that, the treatment with hydrochloric acid and hydrofluoric acid was repeated, silica was removed as much as possible therefrom, 6 mL of 35% hydrochloric acid and 2 mL of 60% nitric acid were added thereto, the mixture was gently warmed and the platinum in the ash was extracted.

2) The extract was filtered through a filter paper of a chemical analysis grade and the filtrate was made 30 mL using a 1.2M hydrochloric acid solution to prepare a solution for the measurement. For the measurement of platinum concentration, a device CIROS-120 manufactured by SPECTRO was used and determination was conducted by means of ICP emission spectroscopy (measuring wavelength was 177.709 nm). The platinum concentration at that time was calculated in terms of the ratio to the weight (coating amount) of a silicone coat layer measured by the method mentioned in the above (6).

(8) Air Permeability

Air permeability under the pressure differences of 10 kPa and 100 kPa was measured using a high-pressure air permeability measuring device (manufactured by OEM System).

Example 1

Polyamide 66 multi-filament yarn comprising 72 filaments and having the total fineness of 470 dtex was woven by plain weave in a water jet room. After that, the product was subjected to a shrinkage processing using boiling water and subjected to a dry finishing at 110° C. to give a woven fabric having the warp density of 46 yarn numbers/2.54 cm, the weft density of 46 yarn numbers/2.54 cm and the cover factor of 1,994.

Then a solvent-free silicone resin composition comprising the following composition and having the viscosity of 22 Pa·sec at 25° C. was prepared. Film strength of the silicone resin at that time was 4.8 MPa and film elongation thereof was 378%.

(Compounding of Solvent-Free Silicone Resin Composition)

(A1) Vinyl group-containing dimethylpolysiloxane (molecular weight: 45000): 24 parts by mass (A2) Vinyl group-containing dimethylpolysiloxane (molecular weight: 23000): 76 parts by mass (B) Methyl hydrogen polysiloxane (molecular weight: 760; hydrogen atom numbers binding to silicon atom: 10): 2 parts by mass (C) Dry silica particles: 14.6% by mass (to the silicone resin composition) (AEROSIL (registered trade mark) NX90 manufactured by Nippon Aerosil; average primary particle size: 20 nm: specific surface area: 90 $m^2/g$; product treated with trimethylsilane)

(D) Organosilicon compound having epoxy groups: 0.3 part by mass (having three methoxy groups and one epoxy group; average molecular weight: 240)

(E) Organosilicon compound having vinyl group binding to silicon atom: 0.2 part by mass (having three acetoxy groups and one vinyl group; average molecular weight: 240)

(F) Platinum catalyst: 27 ppm (to the silicone resin composition)

(G) Red iron oxide pigment: 0.3 part by mass

Onto one side of the above-mentioned woven fabric, this silicone resin composition was coated by means of a floating-knife coating using a knife having the tip shape of semicircular and the tip radius R of 0.3 mm. After that, a curing treatment was conducted at 190° C. for 2 minutes to give a coated base fabric having the coating amount of 15 $g/m^2$. The characteristics of the resulting coated base fabric were evaluated and shown in Table 1. In spite of the low coating amount, the resulting base fabric showed very low air permeability.

Example 2

Polyamide 66 multi-filament yarn comprising 144 filaments and having the total fineness of 470 dtex was woven by plain weave in a water jet room. After that, the product was subjected to a shrinkage processing using boiling water and subjected to a dry finishing at 110° C. to give a woven fabric having the warp density of 51 yarn numbers/2.54 cm, the weft density of 51 yarn numbers/2.54 cm and the cover factor of 2,211. Onto one side of this woven fabric, a solvent-free silicone resin composition having the same composition, film properties, and resin viscosity as in Example 1 was coated by means of a knife coating using a knife having the tip shape of semicircular and the tip radius R of 0.3 mm. After that, a curing treatment was conducted at 190° C. for 2 minutes to give a coated base fabric having the coating amount of 16 $g/m^2$.

The characteristics of the resulting coated base fabric were evaluated and shown in Table 1. In spite of the low coating amount, the resulting base fabric showed very low air permeability.

Example 3

Polyamide 66 multi-filament yarn comprising 144 filaments and having the total fineness of 470 dtex was woven by plain weave in a water jet room. After that, the product was subjected to a shrinkage processing using boiling water and subjected to a dry finishing at 110° C. to give a woven fabric having the warp density of 54 yarn numbers/2.54 cm, the weft density of 54 yarn numbers/2.54 cm and the cover factor of 2,341. Onto one side of this woven fabric, a solvent-free silicone resin composition having the same composition, film properties, and resin viscosity as in Example 1 was coated by means of a knife coating using a knife having the tip shape of semicircular and the tip radius R of 0.3 mm. After that, a curing treatment was conducted at 190° C. for 2 minutes to give a coated base fabric having the coating amount of 14 $g/m^2$.

The characteristics of the resulting coated base fabric were evaluated and shown in Table 1. In spite of the low coating amount, the resulting base fabric showed very low air permeability.

Example 4

Polyamide 66 multi-filament yarn comprising 144 filaments and having the total fineness of 470 dtex was woven by plain weave in a water jet room. After that, the product was subjected to a shrinkage processing using boiling water and subjected to a dry finishing at 110° C. to give a woven fabric having the warp density of 46 yarn numbers/2.54 cm, the weft density of 46 yarn numbers/2.54 cm and the cover factor of 1,994.

Then a solvent-free silicone resin composition having the viscosity at 25° C. of 50 Pa·sec was prepared wherein the composition was the same as in Example 1 except that 20 parts by mass of (A3) vinyl group-containing dimethylpolysiloxane (molecular weight: 67000) and 80 parts by mass of (A4) vinyl group-containing dimethylpolysiloxane (molecular weight: 20000) were added in place of 24 parts by mass of (A1) vinyl group-containing dimethylpolysiloxane (molecular weight: 45000) and 76 parts by mass of (A2) vinyl group-containing dimethylpolysiloxane (molecular weight: 23000). Film strength of the silicone resin at that time was 4.2 MPa and film elongation thereof was 342%.

Onto one side of the above-mentioned woven fabric, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 19 g/m².

The characteristics of the resulting coated base fabric were evaluated and shown in Table 1. In spite of the low coating amount, the resulting base fabric showed very low air permeability.

Example 5

Polyamide 66 multi-filament yarn comprising 108 filaments and having the total fineness of 350 dtex was woven by plain weave in a water jet room. After that, the product was subjected to a shrinkage processing using boiling water and subjected to a dry finishing at 110° C. to give a woven fabric having the warp density of 55 yarn numbers/2.54 cm, the weft density of 55 yarn numbers/2.54 cm and the cover factor of 2,058. Onto one side of this woven fabric, a solvent-free silicone resin composition having the same composition, film properties, and resin viscosity as in Example 1 was coated by means of a knife coating using a knife having the tip shape of semicircular and the tip radius R of 0.3 mm. After that, a curing treatment was conducted at 190° C. for 2 minutes to give a coated base fabric having the coating amount of 16 g/m².

The characteristics of the resulting coated base fabric were evaluated and shown in Table 1. In spite of the low coating amount, the resulting base fabric showed very low air permeability.

Example 6

A solvent-free silicone resin composition having the viscosity at 25° C. of 20 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 14 parts by mass and 86 parts by mass, respectively and that 19 ppm of (F) platinum catalyst was added to the silicone resin composition. Film strength of the silicone resin at that time was 3.5 MPa and film elongation thereof was 320%.

Onto one side of the woven fabric obtained in Example 1, this silicone resin composition was coated by means of a knife coating using a knife having the tip shape of semicircular and the tip radius R of 0.2 mm. After that, a curing treatment was conducted at 190° C. for 2 minutes to give a coated base fabric having the coating amount of 15 g/m².

The characteristics of the resulting coated base fabric were evaluated and shown in Table 1. In spite of the low coating amount, the resulting base fabric showed very low air permeability.

Example 7

A solvent-free silicone resin composition having the viscosity at 25° C. of 20 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 30 parts by mass and 70 parts by mass, respectively and that 29 ppm of (F) platinum catalyst was added to the silicone resin composition. Film strength of the silicone resin at that time was 5.0 MPa and film elongation thereof was 400%.

Onto one side of the woven fabric obtained in Example 4, this silicone resin composition was coated by means of a knife coating using a knife having the tip shape of semicircular and the tip radius R of 0.2 mm. After that, a curing treatment was conducted at 190° C. for 2 minutes to give a coated base fabric having the coating amount of 10 g/m².

The characteristics of the resulting coated base fabric were evaluated and shown in Table 1. In spite of the low coating amount, the resulting base fabric showed very low air permeability.

Example 8

Polyester multi-filament yarn comprising 192 filaments and having the total fineness of 570 dtex was woven by plain weave in a water jet room. After that, the product was subjected to a shrinkage processing using boiling water and subjected to a dry finishing at 110° C. to give a woven fabric having the warp density of 46 yarn numbers/2.54 cm, the weft density of 46 yarn numbers/2.54 cm and the cover factor of 2,196.

A solvent-free silicone resin composition having the viscosity at 25° C. of 17 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 12 parts by mass and 88 parts by mass, respectively and that 16 ppm of (F) platinum catalyst was added to the silicone resin composition. Film strength of the silicone resin at that time was 3.2 MPa and film elongation thereof was 322%.

Onto one side of the above-mentioned woven fabric, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 15 g/m².

The characteristics of the resulting coated base fabric were evaluated and shown in Table 1. In spite of the low coating amount, the resulting base fabric showed very low air permeability.

Comparative Example 1

A solvent-free silicone resin composition having the viscosity at 25° C. of 18 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 10 parts by mass and 90 parts by mass, respectively. Film strength of the silicone resin at that time was 2.5 MPa and film elongation thereof was 164%.

Onto one side of the woven fabric obtained in Example 1, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 20 g/m².

The characteristics of the resulting coated base fabric were evaluated and shown in Table 1. The resulting base fabric showed very bad air permeation property.

Comparative Example 2

A solvent-free silicone resin composition having the viscosity at 25° C. of 20 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 10 parts by mass and 90 parts by mass, respectively and that 60 ppm of (F) platinum catalyst was added to the silicone resin composition. Film strength of the silicone resin at that time was 3.5 MPa and film elongation thereof was 148%.

Onto one side of the woven fabric obtained in Example 1, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 18 g/m².

The characteristics of the resulting coated base fabric were evaluated and shown in Table 1. The resulting base fabric showed very bad air permeation property.

Comparative Example 3

A solvent-free silicone resin composition having the viscosity at 25° C. of 21 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 34 parts by mass and 66 parts by mass, respectively and that 30 ppm of (F) platinum catalyst was added to the silicone resin composition. Film strength of the silicone resin at that time was 2.8 MPa and film elongation thereof was 350%.

Onto one side of the woven fabric obtained in Example 4, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 15 g/m².

The characteristics of the resulting coated base fabric were evaluated and shown in Table 1. The resulting base fabric showed very bad air permeation property.

Comparative Example 4

A solvent-free silicone resin composition having the viscosity at 25° C. of 65 Pa·sec was prepared wherein the composition was the same as in Example 1 except that the adding amounts of (A1) vinyl group-containing dimethylpolysiloxane (molecular weight: 45000) and (A2) vinyl group-containing dimethylpolysiloxane (molecular weight: 23000) were changed to 40 parts by mass and 60 parts by mass, respectively and that 200 ppm of (F) platinum catalyst was added to the silicone resin composition. Film strength of the silicone resin at that time was 5.5 MPa and film elongation thereof was 450%.

Onto one side of the woven fabric obtained in Example 4, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 30 g/m².

The characteristics of the resulting coated base fabric were evaluated and shown in Table 1. In the resulting base fabric, although the air permeation property was good, its package ability was very bad because of too much coated amount.

Comparative Example 5

A solvent-free silicone resin composition having the viscosity at 25° C. of 19 Pa·sec was prepared wherein the composition was the same as in Example 1 except that 100 parts by mass of just one kind of (A5) vinyl group-containing dimethylpolysiloxane (molecular weight: 26800) was added in place of 24 parts by mass of (A1) vinyl group-containing dimethylpolysiloxane (molecular weight: 45000) and 76 parts by mass of (A2) vinyl group-containing dimethylpolysiloxane (molecular weight: 23000), that 2 parts by mass of (B2) methyl hydrogen polysiloxane (molecular weight: 6900; hydrogen atom numbers binding to silicon atom: 50) was added in place of 2 parts by mass of (B1) methyl hydrogen polysiloxane (molecular weight: 760; hydrogen atom numbers binding to silicon atom: 10) and that 50 ppm of (F) platinum catalyst was added to the silicone resin composition. Film strength of the silicone resin at that time was 2.7 MPa and film elongation thereof was 345%.

Onto one side of the woven fabric obtained in Example 1, this silicone resin composition was coated by means of a knife coating using a knife having the tip shape of semicircular and the tip radius R of 0.3 mm. After that, a curing treatment was conducted at 190° C. for 2 minutes to give a coated base fabric having the coating amount of 15 g/m².

The characteristics of the resulting coated base fabric were evaluated and shown in Table 1. The resulting base fabric showed very bad air permeation property.

TABLE 1

| | | Example 1 | Example 2 | Example 3 | Example 4 | Example 5 | Example 6 | Example 7 | Example 8 |
|---|---|---|---|---|---|---|---|---|---|
| Total fineness | dtex | 470 | 470 | 470 | 470 | 350 | 470 | 470 | 570 |
| Filament count | yarn number | 72 | 144 | 144 | 144 | 108 | 72 | 144 | 192 |
| Weaving density (warp/weft) | yarn numbers/ 2.54 cm | 46/46 | 51/51 | 54/54 | 46/46 | 55/55 | 46/46 | 46/46 | 46/46 |
| Cover factor | — | 1,994 | 2,211 | 2,341 | 1,994 | 2,058 | 1,994 | 1,994 | 2,196 |
| Resin viscosity | Pa · sec | 22 | 22 | 22 | 50 | 22 | 20 | 40 | 17 |
| Resin film strength | MPa | 4.8 | 4.8 | 4.8 | 4.2 | 4.8 | 3.5 | 5.0 | 3.2 |
| Resin film elongation | % | 378 | 378 | 378 | 342 | 378 | 320 | 400 | 322 |
| Coating amount | g/m² | 15 | 16 | 14 | 19 | 16 | 15 | 10 | 16 |

TABLE 1-continued

| | | Comparative Example 1 | Comparative Example 2 | Comparative Example 3 | Comparative Example 4 | Comparative Example 5 | | | |
|---|---|---|---|---|---|---|---|---|---|
| Air permeability (at pressure difference of 10 kPa) | L/cm²/min | 0.000 | 0.000 | 0.000 | 0.000 | 0.000 | 0.000 | 0.000 | 0.000 |
| Air permeability (at pressure difference of 100 kPa) | L/cm²/min | 0.005 | 0.004 | 0.003 | 0.004 | 0.007 | 0.008 | 0.010 | 0.009 |

| | | Comparative Example 1 | Comparative Example 2 | Comparative Example 3 | Comparative Example 4 | Comparative Example 5 |
|---|---|---|---|---|---|---|
| Total fineness | dtex | 470 | 470 | 470 | 470 | 470 |
| Filament count | yarn number | 72 | 72 | 144 | 144 | 72 |
| Weaving density (warp/weft) | yarn numbers/ 2.54 cm | 46/46 | 46/46 | 46/46 | 46/46 | 46/46 |
| Cover factor | — | 1,994 | 1,994 | 1,994 | 1,994 | 1,994 |
| Resin viscosity | Pa·sec | 18 | 20 | 21 | 65 | 19 |
| Resin film strength | MPa | 2.5 | 3.5 | 2.8 | 5.5 | 2.7 |
| Resin film elongation | % | 164 | 148 | 350 | 450 | 345 |
| Coating amount | g/m² | 20 | 18 | 15 | 30 | 15 |
| Air permeability (at pressure difference of 10 kPa) | L/cm²/min | 0.000 | 0.000 | 0.000 | 0.000 | 0.000 |
| Air permeability (at pressure difference of 100 kPa) | L/cm²/min | 0.032 | 0.028 | 0.023 | 0.003 | 0.025 |

INDUSTRIAL APPLICABILITY

The coated base fabric for an air bag according to the present invention can maintain a low air permeability even in a low coating amount and have light weight and excellent package ability. Therefore, the coated base fabric for an air bag according to the present invention can be used for a wide range not only for air bags against a head-on collision of a driver and a person in a passenger seat but also for side air bags, curtain air bags and knee airbags where the inner pressure keeping property is particularly demanded. Accordingly, the coated base fabric for an air bag according to the present invention greatly contributes in industry.

The invention claimed is:

1. A coated base fabric for an air bag, comprising:
a woven fabric comprising synthetic fiber filaments, and
a silicone resin coated at least on one side of the woven fabric, the silicone resin obtained by curing a composition comprising (A1) an alkenyl group-containing polysiloxane having a molecular weight of 35000 or more and (A2) an alkenyl group-containing polysilxoane having a molecular weight of 30000 or less;
wherein the coating amount of the silicone resin is 20 g/m² or less, film strength and film elongation of the resin are 3 MPa or more and 300% or more, respectively, and air permeability of the coated base fabric under the pressure difference of 100 kPa is 0.02 L/cm²/min or less.

2. The coated base fabric for an air bag according to claim 1, wherein the silicone resin is a solvent-free silicone of an addition polymerization type and contains 1 to 45ppm of a platinum catalyst to the resin composition.

3. The coated base fabric for an air bag according to claim 1, wherein viscosity of the silicone resin before coating is 15 to 60 Pa·sec.

4. The coated base fabric for an air bag according to claim 1, wherein the method for coating the resin is a knife coating method and the tip radius of the knife used therefor is 0.7 mm or less.

5. The coated base fabric for an air bag according to claim 1, wherein the total fineness of the filaments constituting the woven fabric is 200 to 470 dtex.

6. The coated base fabric for an air bag according to claim 1, wherein the cover factor of the woven fabric is 1,800 to 2,500.

7. The coated base fabric for an air bag according to claim 1, wherein the amount of ingredient (A1) is 11 to 30% of the total amount of ingredients (A1) and (A2), and the amount of ingredient (A2) is 70 to 89% of the total amount of ingredients (A1) and (A2).

* * * * *